3,264,283
PREPARATION OF AMIDOETHYL STARCH ETHERS BY ALKALINE HYDROLYSIS OF CYANOETHYL STARCH ETHERS
Wadym Jarowenko, Plainfield, N.J., assignor to National Starch and Chemical Corporation, New York, N.Y., a corporation of Delaware
No Drawing. Filed Aug. 28, 1964, Ser. No. 392,901
1 Claim. (Cl. 260—233.3)

This application is a continuation-in-part of my copending application, Serial No. 161,407, filed December 22, 1961, now abandoned.

This invention relates to a novel process for preparing starch ethers from intact granule cyanoalkylated starches, said process producing starch ethers which still retain their intact granule form and which exhibit improved swelling and dispersibility in water in comparison to the cyanoalkylated starches from which they are derived. More particularly, this invention relates to a method for preparing amidoalkyl starch ethers containing amide groups or combinations of amide and nitrile groups as well as traces of carboxyl groups, said starch ethers exhibiting vastly improved dispersibility over cyanoalkyl starches which have been prepared by means of prior art techniques.

It is well known in the art that starch occurs in nature in the form of a granule of complex structure. When suspended in water and heated to a sufficient degree (varying for each starch type) or when subjected to sufficient alkalinity, these intact granules will swell and disintegrate, i.e. gelatinize, so as to result in the preparation of a hydrated colloidal dispersion wherein the individual particles comprising the intact granules no longer exist. This is often referred to as "dissolving" the starch or forming a starch "solution," although these are not solutions in the strictest sense. It is also well known that once a starch granule has been gelatinized and "dissolved," and the "solution" dried, as by passing over heated drums or by other drying means, the solid "pre-gelatinized" product thus obtained no longer possesses an intact granule structure.

In the above described copending application, there is described a method for the treatment of cyanolakyl starch ethers which would result in the alkaline hydrolysis of a substantial portion of said cyanoalkyl groups to the corresponding amidoalkyl groups. This alkaline hydrolysis technique was described as being equally applicable to cyanoalkyl starches which were either in their original intact granule form or which were, on the other hand, pre-gelatinized and therefore no longer in possession of their original intact granule structure.

I have since found that the use of pregelatinized cyanoalkyl starches in the alkaline hydrolysis process of my invention is of considerably less commerical importance than the use, and the products derived from such use, of intact granule cyanoalkyl starches. Thus, when attempts are made to conduct this alkaline hydrolysis treatment with full scale industrial processing equipment, there are a number of significant disadvantages resulting from the use of such pregelatinized cyanoalkyl starches.

To begin with, the initial dispersion of pregelatinized cyanoalkyl starches requires their admixture with substantial quantities of water in view of their tendency to form extremely viscous solutions. This extensive dilution leads, in turn, to the need for higher concentrations of reagents as well as for the use of expensive, heavy duty mixing equipment. In contrast, intact granule cyanoalkyl starches require admixture with substantially less water inasmuch as they do not disperse or dissolve to form highly viscous solutions but merely remain suspended in a completely heterogeneous system. In addition, there is also a problem of separating the resulting cold water soluble, pregelatinized products from the homogeneous systems wherein they have been prepared. The latter problem does not, of course, exist when intact granule cyanoethyl starches are employed since the resulting products are not dispersed or dissolved in a homogeneous system but are, rather, the solid phase of a heterogeneous system and may, therefore, be simply removed by means of filtration or centrifugation. In contrast, the products derived from pregelatinized cyanoalkyl starches must be recovered from their homogeneous systems by means of expensive and time consuming separation procedures such, for example, as by the use of an alcohol precipitation technique. Finally, it may be noted that when pregelatinized products are employed in the process of my invention, the resulting products are often difficult to utilize in view of their pronounced tendency to form lumps when admixed with water.

The object of this invention is to provide a method for producing starch products of improved stability and dispersibility in water. Another object of this invention is the production of starch derivatives possessing substituent groups capable of undergoing varying degrees of modification. Still another object of this invention is to provide a method for producing starch derivatives having unique colloidal properties. A further object of this invention is the production from intact granule cyanoalkyl starches, of essentially non-inhibited starch derivatives which still retain their intact granule form. Other objects and the advantages of this invention will be apparent from the following description.

In accordance with the invention, intact granule cyanoalkylated starch derivatives are subjected to aqueous alkaline hydrolysis in the presence of hydrogen peroxide. The process can be adjusted to result in partial or essentially complete conversion of the nitrile groups to amide groups. The highly stable starch ethers produced by the method of this invention are all characterized by the fact that while still retaining an intact granule structure, they nonetheless displayed excellent stability and a minimum degree of granule inhibition as is evidenced by their excellent dispersibility. For purposes of brevity and convenience, the modified cyanoethyl starch ethers produced by the method of this invention will hereinafter be referred to as starch ethers.

It is well known in the art that the intact granule form of cyanoalkylated starches, and particularly the intact granule form of cyanoethylated starches, display a considerable degree of granule inhibition as evidenced by the poor dispersibility of their heated aqueous suspensions which are ordinarily referred to as "cooks." Thus, for example, the cooks of such intact granule cyanoethyl starches tend to readily settle on standing at room temperature. Such settling results from the fact that the inhibited starch granules are resistant to swelling under normal cooking conditions and therefore remain undispersed, or only partly dispersed, at the end of the cooking cycle.

The mechanism which accounts for this granule inhibition is thought to result from a chemical crosslinking reaction which effects a toughening of the intact granule structure. It is believed that this crosslinking reaction results from the interaction between the hydroxyl and nitrile groups on the cyanoalkyl starch molecule which thus leads to the formation of ester group cross linkages.

Granule inhibition of cyanoethylated starches is especially prevalent when these derivatives are prepared by means of reactions which are completed at low pH levels whereby the pH of the reaction mixture is adjusted to a value of 7 or less. Thus, in an attempt to eliminate such inhibition, Paschall et al., U.S. 2,965,632, employed a technique wherein the cyanoethyl derivatives were prepared at a pH substantially greater than 7 whereupon they were drum dried so as to effect their gelatinization. Thus, while the latter process succeeds in preparing products which have improved dispersibility, they are, however, no longer in possession of an intact granule structure. The process of my invention, on the other hand, retains the granule structure of the starch, permits the use of neutral or acidic pH levels and provides a means by which granule inhibition may be controlled in order to provide varying degrees of dispersibility in the resulting product.

It should be noted, at this point, that although the prior art makes reference to the use of aqueous, alkaline hydrogen peroxide systems for the hydrolysis of organic nitriles, such earlier teachings are all characterized by the use of extremely severe reaction conditions which would not be suitable for use with intact granule starches and/or by the fact that they utilize homogeneous systems which are similarly inapplicable for use with intact granule starches. Thus, for example, Dreyfus, U.S. Patents Nos. 2,015,104 and 2,186,101, teaches the hydrolysis of nitrile containing cellulose derivatives by boiling in water under pressure or by boiling in water in the presence of catalysts such as hydrochloric acid or hydrogen peroxide or by heating with hydrogen peroxide in conjunction with sodium peroxide. Obviously, the latter disclosures are neither directed towards nor suitable for a similar treatment of intact granule starches. Wagner et al., pages 412 and 570 of "Synthetic Organic Chemistry," published in 1953 by John Wiley and Sons, New York, New York, describe the hydrolysis of aliphatic and aromatic nitriles with aqueous, alkaline hydrogen peroxide in homogeneous organic or aqueous solvent systems which could not, of course, be utilized with intact granule starches. In contrast, the process of my invention employs mild reaction conditions wherein the intact granule starch remains as a solid phase which is never dissolved or dispersed within the aqueous medium of a heterogeneous system.

In the process of this invention, a suspension of a starch having an intact granule structure is reacted with a cyanoalkylating reagent, using conventional cyanoalkylation reaction procedures. In these reactions, sodium hydroxide is usually employed as a catalyst, and suitable gelatinization inhibitors may also be utilized. After cyanoalkylation is complete, hydrogen peroxide is added directly to the reaction mixture, while the latter is maintained at alkaline conditions. The hydrogen peroxide, under the conditions specified hereinafter, penetrates the intact granule and reacts essentially with the nitrile groups without appreciably degrading the starch. In those reactions wherein a controlled pH is desired, throughout the course of the reaction, diluted alkali is added during the reaction in such amounts serving to maintain a constant pH. If thin boiling starch products are desired, the conditions of the reaction may be altered to produce such products. By the method of this invention I have, therefore, obtained excellent products displaying improved dispersibility and decreased inhibition.

By the method of this invention, I have also produced starch ethers containing various combinations of nitrile, amide, and carboxyl groups, these ethers exhibiting unique colloidal properties. The process of my invention can also result in the production of granular, non-inhibited cyanoethylated starch ethers wherein only a fraction of the nitrile groups have been hydrolyzed to amide groups. My procedure possesses the additional advantage that recovery of the substituted starch products is facilitated by using simple filtration or centrifugation means. Moreover, the heterogeneous system in which the process of this invention must, of necessity, occur does not materially affect the extent of the conversion of nitrile groups to amide groups. The starch products produced by my procedure may be collected, as was mentioned hereinabove, by filtering or centrifuging. The dispersibility of the resulting conversion products may be conveniently measured by means well known to the practitioner, for example, by measuring the amount of sediment that forms after cooking a dispersion of the conversion product for a required length of time.

The reaction employed to cyanoalkylate the starch or starch product may comprise a conventional Williamson or Michael type reaction. The particular alkylation reaction used will depend upon the cyanoalkylating reagent which is employed. Any of the cyanoalkylating agents generally known in the art may be used to introduce nitrile groups into the starch molecule. I have found that favorable results are obtained by employing starch or starch derivatives having an intact, granular structure in a Michael reaction with acrylonitrile. In this reaction sodium hydroxide is usually employed as a catalyst, and suitable gelatinization inhibitors, such as sodium sulfate, magnesium sulfate, sodium chloride, and similar salts, are also utilized. No gelatinization inhibitors are necessary when less than 5% by weight of acrylonitrile is used. In the cyanoethylation of intact granule starches to form intact granule products, I have found that the use of 1.5 to 15% of cyanoethylating agents, such as acrylonitrile (as based on the weight of the starch or starch product), results in products which exhibit satisfactory stabilization and filtration characteristics.

It should be noted at this point that the above discussion relating to the cyanoalkylation of starch does not comprise a novel aspect of the process of my invention and is provided only as a means of familiarizing the practitioner with the prior art in this field. It should also be mentioned that, although the discussion of my invention refers in particular to the preparation of cyanoethyl starch ethers, the preparation of any homologous cyanoalkyl starch ether whose dispersibility may be improved is included within the scope of the invention.

After the cyanoethylation of the starch has been completed, hydrogen peroxide may be added directly to the same reaction mixture containing the starch nitrile ether. If hydrolysis of the starch nitrile ether is not desired at this point, then the derivative may be isolated at this point by filtering or centrifuging the mixture, the hydrolysis being carried out subsequently. However, it is preferred that the peroxide be directly added to the reaction mixture after cyanoethylation and then allowed to react at room (i.e., about 20° C.) or elevated temperature, while maintaining an alkaline pH. Any base may be employed as a catalyst in the nitrile hydrolysis reaction. Particularly useful in the process of the invention are the hydroxides of the alkali and alkaline earth metals, as well as ammonium hydroxide, quaternary ammonium bases, amines, tetramethyl guanidine, and similar basic compounds.

The temperature of the hydrolysis reaction should not exceed 40° C. for nitrogen loss becomes appreciable at elevated temperatures under alkaline conditions. Considerable loss of nitrogen due to hydrolysis of the amide groups and de-cyanoalkylation is also noted if the reaction time exceeds 20 hours. Although water is the preferred medium for the hydrolysis of the starch nitrile ethers, an aqueous medium containing water miscible solvents, such as acetone, ethyl alcohol, dioxane and the like, may also be used to carry out the hydrolysis.

The hydrogen peroxide, when reacted with the cyanoalkyl derivative under the conditions of my process, will penetrate the intact starch granules and react with the nitrile groups without appreciably degrading the starch. Degradation of the starch is effectively limited by running the reaction at room temperature for a period of about 1 hour, in a suspension maintained at a pH ranging from about 9.5 to about 10.0. If some conversion of the starch is desired, then more alkaline conditions, higher temperatures, or longer reaction times as well as higher concentrations of hydrogen peroxide may be used.

The concentration of peroxide to be used is determined by the amount of nitrile groups present in the original intact granule cyanoalkyl starch and also by the degree of dispersibility and the concentration of amide groups which is desired in the final product. For the purposes of this invention, concentrations of hydrogen peroxide ranging from about 0.11 to about 2.2 moles of hydrogen peroxide per mole of nitrile groups in the cyanoalkyl starch were found to produce the most favorable results. Concentrations of peroxide below this range do not produce an appreciable change in the original cyanoalkylated product. On the other hand, concentrations greater than the range specified above are not necessary since the reaction appears to proceed to completion without the use of more than 2.2 moles of peroxide per mole of nitrile.

The extent of conversion of the nitrile groups to amide groups is dependent on the concentration of hydrogen peroxide, the pH, the temperature, and the reaction time. Although higher concentrations of hydrogen peroxide may be used, it is preferred to use about 1.0 to about 2.2 moles of hydrogen peroxide per mole of nitrile group in the cyanoalkyl starch in order to obtain substantially complete conversion of the nitrile groups. In order to realize such conversion, the nitrile hydrolysis reaction may be run at a pH of from 9.0 to 12.0 for a period of approximately 1 hour or more. It is to be understood that varying degrees of conversion will be achieved according to the values of the variables (i.e., peroxide concentration, temperature, pH, reaction time) affecting the conversion.

Diluted alkali is added over the course of the reaction in order to maintain the pH within he desired range. The periodic addition of alkali during he reaction is necessary in view of the fact that the pH decreases rapidly upon addition of hydrogen peroxide to the reaction mixture. If it is desired to run the reaction without the periodic addition of alkali, all of the alkali is added to the reaction mixture before the cyanoalkylation reaction is begun. In these reactions which dispense with continual addition of alkali to the mixture, the cyanoethylation and the hydrolysis of the nitrile groups is carried out in the same reaction mixture, all of the alkali being added before cyanoethylation is undertaken. I have found that the pH of these reactions varies from about 11.8 at the start of the cyanoethylation to about 9.5 at the completion of nitrile hydrolysis. As the pH is increased, the nitrile groups undergo conversion more rapidly and may be hydrolyzed to carboxyl groups. A pH of about 11.0 may be used for the simultaneous hydrolysis of nitrile groups and degradation of the starch yielding thin boiling derivatives containing both amide and carboxyl groups. However, it should be noted that even under optimum conditions, trace amounts of carboxyl groups may be produced.

Lower pH values, as well as lower concentrations of hydrogen peroxide and shorter reaction times result in partial conversion of the nitrile to amide groups. It has been noted in the prior art that cyanoethylation of intact granular starches often yields inhibited products which do not cook readily, that is, products which could not be completely gelatinized by cooking in water at a neutral pH. The process of this invention overcomes the aforementioned inhibition and yields dispersions of conversion products exhibiting remarkable stability and clarity without cohesiveness by converting only part of the nitrile groups of the starch ether to amide groups, i.e. amidoethyl groups, and/or carboxyl groups, i.e., carboxyethyl groups. Partial conversion of the nitrile groups of cyanoalkyl starch ethers may be carried out using about 0.11 to about 0.50 mole of hydrogen peroxide per mole of nitrile group. The partial conversion of starch nitrile ethers to starch amides may be accomplished by employing conditions of pH ranging from about 9.5 to about 10.5 for a period of 1 hour. It is a feature of my invention that essentially non-inhibited starch ethers of intact granule structure can be produced by hydrolyzing a part or all of the nitrile groups of cyanoalkyl starch ethers to amide groups. The temperature of the reaction, as was mentioned previously, should not exceed 40° C. because of the consequent loss in nitrogen.

The effectiveness of my invention in reducing the inhibition of cyanoalkylated starch derivatives of intact granule structure is best reflected by sedimentation or settling tests. Inhibited starch products exhibit limited ability to be dispersed in water and consequently, on cooking such an inhibited product in water, some of the product will settle and form a sediment on the bottom of the container wherein the dispersion has been prepared. An increase in the degree of inhibition of a starch derivative is accompanied by increased settling of the derivative and a smaller sediment volume. Similarly, improved dispersibility of starch derivatives is evidenced by less settling and a greater sediment volume. This sedimentation volume test, as applied in the present invention, will be described in greater detail hereinafter.

The process of this invention can be used to prepare completely dispersible, intact granule starch ethers from any intact granule starch nitrile ether, including cyanoalkyl ethers derived from starch types such as corn, high amylose corn, sago, wheat, rice, sweet potato, sorghum, waxy sorghum, waxy maize, potato or tapioca starches, and their thin boiling counterparts, such as partially hydrolyzed and oxidized starches which still retain their intact granule form.

From the discussion set forth hereinabove, it can be seen that the process of the present invention can be varied to yield fully dispersible starch ethers, containing amide, carboxyl and nitrile groups, having varying degrees of substitution, thereby enabling the practitioner to obtain derivatives differing considerably in properties. Partial hydrolysis of the nitrile groups of the cyanoalkyl starch ether by the method of this invention yields derivatives whose aqueous dispersions exhibit considerable stability and clarity. Moreover, essentially non-inhibited, intact granule starch derivatives may be obtained from cyanoethyl starches by hydrolyzing only a minor fraction of the nitrile groups. The derivatives produced by the process of this invention, in addition to being capable of undergoing further modification, can also be used in warp sizing, in adhesive and coating applications, and in flocculation and flotation applications. Derivatives containing amide groupings can also undergo reaction with insolubilizing agents to produce highly useful products.

In the following examples which further illustrate the embodiment of my invention, all parts given are by weight unless otherwise indicated.

*Example I*

This example illustrates the continuous process of cyanoethylation and the subsequent reduction of granule inhibition by the hydrolysis of the nitrile groups of the resulting cyanoalkyl starch to amide groups by the use of the process of my invention, whereby the cyanoethylation and the subsequent hydrolysis are carried out without adding alkali during the course of the reaction.

The same procedure was followed in each of the reactions set forth in this example. A gelatinization inhibitor and sodium hydroxide were dissolved in water, intact starch granules were suspended in the solution, acrylonitrile was added, and the resulting mixture heated and agitated at 40° C. for 4 hours. Hydrogen peroxide was then added to the mixture and the reaction was continued at room temperature for about 16 hours. In each instance, the pH of the mixture ranged from about 9.5 before cyanoethylation to about 9.0 at the completion of the hydrolysis. Any residual hydrogen peroxide which may have been present was destroyed by adding sodium bisulfite, the pH was adjusted to 6.5, and the product was filtered, washed, and dried.

In determining the sediment volume of the starch products set forth in this example, as well as for all the starch products similarly tested in subsequent examples, the procedure employed comprised cooking a 1% by weight aqueous dispersion of the starch for 20 minutes on a boiling water bath. After the cooked dispersion had been allowed to stand for 16 hours in a 100 ml. graduated cylinder at room temperature, the sediment volume was determined by reading off the level to which the swollen starch particles had settled. No sedimentation, that is, the absence of sediment particles, indicates complete dispersibility of the products.

(a) The aforedescribed procedure was applied to a reaction mixture of the following composition:

| Component: | Parts |
| --- | --- |
| Corn starch | 100 |
| Water | 125 |
| Sodium hydroxide | 0.8 |
| Acrylonitrile | 10 |
| Sodium sulfate | 30 |

The cyanoalkylated base had a nitrogen content of 1.88%.

After reaction at 40° C. for 4 hours, 4.25 parts of 30% hydrogen peroxide (corresponding to 0.28 mole of hydrogen peroxide per mole of nitrile) were added to the mixture and the reaction was continued for 16 hours at room temperature. The conversion product had a nitrogen content of 1.88% and infrared spectra indicated the appearance of amide groupings and decrease of nitrile groups. The sedimentation volume at pH=3 of the cyanoalkylated base was 7 ml., whereas that of the conversion product was 19 ml., thereby indicating greater swelling on the part of the conversion product.

(b) The aforedescribed procedure was applied to a reaction mixture of the following composition:

| Component: | Parts |
| --- | --- |
| Corn starch | 100 |
| Water | 125 |
| Sodium hydroxide | 0.8 |
| Acrylonitrile | 10 |
| Sodium sulfate | 30 |

The cyanoalkylated base had a nitrogen content of 1.88%.

After reaction at 40° C. for 4 hours, 8.5 parts of 30% hydrogen peroxide (corresponding to 0.56 mole of hydrogen peroxide per mole of nitrile) were added to the mixture and the reaction was continued for 16 hours at room temperature. The conversion product had a nitrogen content of 1.88% and infrared spectra indicated the appearance of amide groupings and decrease of nitrile groups. The sedimentation volume at pH=3 of the cyanoalkylated base was 7 ml., whereas that of the conversion product was 21 ml.

(c) The aforedescribed procedure was applied to a reaction mixture of the following composition:

| Component: | Parts |
| --- | --- |
| Corn starch | 100 |
| Water | 125 |
| Sodium hydroxide | 0.8 |
| Acrylonitrile | 10 |
| Sodium sulfate | 30 |

The cyanoalkylated base had a nitrogen content of 1.88%.

After reaction at 40° C. for 4 hours, 17 parts of 30% hydrogen peroxide (corresponding to 1.12 moles of hydrogen peroxide per mole of nitrile) were added to the mixture and the reaction was continued for 16 hours at room temperature. The conversion product had a nitrogen content of 1.78% and infrared spectra indicated the appearance of amide groups and a decrease in the number of nitrile groups. The sedimentation volume at pH=3 of the cyanoalkylated base was 7 ml., whereas that of the conversion product was 27 ml.

*Example II*

This example illustrates the reduction of inhibition in granular cyanoethylated starches by partial hydrolysis of nitrile groups to amide groups by means of the process of my invention.

(a) 100 parts of cyanoethylated corn starch containing 2.27% nitrogen (on dry basis) were suspended in granular form in 126 parts of water containing 30 parts of sodium sulfate as a gelatinization inhibitor and 0.8 part of sodium hydroxide. The temperature of the reaction mixture was raised to 38° C. and 2.04 parts of a 30% aqueous solution of hydrogen peroxide (corresponding to 0.111 mole of hydrogen peroxide per mole of nitrile) were then added to the mixture at the rate of 1 milliliter per minute.

After the mixture was agitated for 18 hours at a temperature of 38° to 40° C., the residual hydrogen peroxide was destroyed with sodium bisulfite, the pH was adjusted to 6.5, and the conversion product was recovered by filtration and washing. The pH of the mixture ranged from about 11.8 before reaction to about 9.5 at the completion of the hydrolysis. The conversion product had a nitrogen content of 1.97% (on dry basis) and infrared spectra indicated the presence of amide groups. The sedimentation volume at pH=3 of the base was 10 ml., whereas that of the conversion product was 30 ml.; the sedimentation volume at pH=7 of the base was 13 ml., whereas the conversion product was completely dispersible. It should be noted that, in most cases, the inhibition in intact granule cyanoethylated starches increases with low pH, as is evidenced by a smaller sedimentation volume at pH=3 than pH=7.

(b) The procedure and composition of the reaction mixture described in part (a) of this example were utilized with the exception that 16.32 parts of a 30% aqueous solution of hydrogen peroxide (corresponding to 0.888 mole of hydrogen peroxide per mole of nitrile) were added to the reaction mixture. The conversion product had a nitrogen content of 1.91% (on a dry basis) and infrared spectra showed the presence of amide groups. The sedimentation volume at pH=3 of the base was 10 ml., whereas the conversion product was completely dispersible; the sedimentation volume at pH=7 of the base was 13 ml., whereas the product was completely dispersible.

(c) The procedure and composition of the reaction mixture described in part (a) of this example were utilized with the exception that 32.6 parts of a 30% aqueous solution of hydrogen peroxide (corresponding to 1.78 moles of hydrogen peroxide per mole of nitrile) were added to the reaction mixture. The conversion product had a nitrogen content of 1.92% (on a dry basis) and infrared spectra analysis showed the presence of amide groups. The sedimentation volume at pH=3 of the base was 10 ml., whereas the product was completely dispersible; the sedimentation volume at pH=7 of the base was 13 ml., whereas the conversion product was completely dispersible.

*Example III*

This example illustrates the application of the process of my invention to the elimination of inhibition in derivatives of various types of starch.

(a) 100 parts of a cyanoethylated potato starch base containing 2.50% nitrogen (on a dry basis) were suspended in granule form in 150 parts of water containing 30 parts of sodium sulfate as a gelatinization inhibitor and 0.8 part of sodium hydroxide. To this reaction mixture 2.0 parts of a 30% aqueous solution of hydrogen peroxide (corresponding to 0.099 mole of hydrogen peroxide per mole of nitrile) were then added, and the mixture was agitated at room temperature for 16 hours. Residual hydrogen peroxide was destroyed with sodium bisulfite, the pH was adjusted to 6.5, and the conversion product was recovered by filtration and washing. The pH of the mixture ranged from about 11.8 before reaction to about 9.5 at the completion of the hydrolysis. The conversion product had a nitrogen content of 2.30% (on a dry basis) and infrared spectra indicated the presence of amide groups and the decrease of nitrile groups. The sedimentation volume at pH=3 of the base was 12 ml., whereas that of the conversion product was 27 ml.; the sedimentation volume at pH=7 of the base was 10 ml., whereas that of the conversion product was 29 ml.

(b) 100 parts of a cyanoethylated potato starch base containing 2.50% nitrogen (on a dry basis) were suspended in granule form in 150 parts of water containing 30 parts of sodium sulfate as a gelatinization inhibitor and 0.8 part of sodium hydroxide. To the reaction mixture 19.0 parts of a 30% aqueous solution of hydrogen peroxide (corresponding to 0.94 mole of hydrogen peroxide per mole of nitrile) were then added, and the mixture was agitated at room temperature for 16 hours. Residual hydrogen peroxide was destroyed with sodium bisulfite, the pH was adjusted to 6.5, and the conversion product was recovered by filtration and washing. The pH of the mixture ranged from about 11.8 before reaction to about 9.5 at the completion of the hydrolysis. The conversion product had a nitrogen content of 2.22% (on a dry basis) and infrared spectra indicated the presence of amide groups and the decrease of nitrile groups. The sedimentation volume at pH=3 of the base was 12 ml., whereas that of the conversion product was 80 ml.; the sedimentation volume at pH=7 of the base was 10 ml., whereas that of the conversion product was completely dispersible.

(c) 100 parts of a cyanethylated tapioca starch base containing 2.36% nitrogen (on a dry basis) were suspended in granule form in 150 parts of water containing 30 parts of sodium sulfate as a gelatinization inhibitor and 0.8 part of sodium hydroxide. To the reaction mixture 19.0 parts of a 30% aqueous solution of hydrogen peroxide (corresponding to 1.00 mole of hydrogen peroxide per mole of nitrile) were then added. The pH of the mixture ranged from about 11.8 before reaction to about 9.5 at the completion of the hydrlysis. The conversion product had a nitrogen content of 2.0% (on a dry basis) and infrared spectra indicated the presence of amide groups and a decrease in the number of nitrile groups. The sedimentation volume at pH=3 of the base was 9 ml., whereas that of the conversion product was 31 ml.; the sedimentation volume at pH=7 of the base was 10 ml., whereas that of the conversion product was 62 ml.

*Example IV*

This example illustrates the effect which an increase in reaction time has upon the swelling properties and hydrolysis of nitrile groups in a cyanoethylated corn starch of high amylose content (about 57% amylose) using the process of my invention.

The procedure as set forth in Example I was essentially followed in treating the formulation of this example with the exception that the reaction temperature and the reaction time were varied.

Six identical compositions comprising:

| Component: | Parts |
|---|---|
| Cyanoethylated high amylose corn starch (nitrogen content=2.3%) | 100 |
| Water | 150 |
| Sodium sulfate | 50 |
| Sodium hydroxide | 0.8 |
| Hydrogen peroxide (30%) (0.66 mole of peroxide/mole of nitrile) | 12.2 | were treated at room temperature and at 40° C. for periods of 30, 60, and 90 minutes. The pH of these mixtures ranged from about 11.5 before reaction to about 9.0 at the completion of the hydrolysis. The results of the various reaction conditions are reproduced in the table below.

| Time (minutes) | Temperature | Percent Nitrogen in Product | Sedimentation Volume [1] |
|---|---|---|---|
| 30 | Room | 2.19 | None. |
|  | 40° C. | 2.19 | None. |
| 60 | Room | 2.19 | None. |
|  | 40° C. | 2.19 | None. |
| 90 | Room | 2.16 | None. |
|  | 40° C. | 2.16 | None. |

[1] Sedimentation volume of the base: at pH=3 was 14 ml.; at pH=7 was 10 ml.

With this particular sample, the treatment therefore appears essentially complete after 1 to 1.5 hours as far as elimination of granule inhibition is concerned.

*Example V*

This example illustrates the improvement of the dispersibility of a cyanoethylated corn starch of high amylose content (about 57% amylose) and of a cyanoethylated tapioca using various catalysts in the process of my invention.

(a) 50 parts of a cyanoethylated corn starch (57% amylose content) in granular form containing 2.30% nitrogen (on a dry basis) were suspended in 75 parts of water. 3.05 parts of a 30% aqueous solution of hydrogen peroxide (corresponding to 0.165 mole of hydrogen peroxide per mole of nitrile) were then added to the suspension, and the pH was maintained at 10.0 by adding 1.3 parts of a 58% by weight aqueous ammonium hydroxide solution. After the reaction was continued for 1 hour at room temperature, residual hydrogen peroxide was destroyed with sodium bisulfite, the pH was adjusted to 6.5, and the product was removed by filtration. The sedimentation volume test of the product indicated that the product was essentially completely dispersible, whereas the untreated cyanoethyl starch had sediment volumes of 14 ml. at pH 7 and 10 ml. at pH 3.

(b) 50 parts of a cyanoethylated corn starch (57% amylose content) in granular form containing 2.30% nitrogen (on a dry basis) were suspended in 75 parts of water. 6.1 parts of a 30% aqueous solution of hydrogen peroxide (corresponding to 0.323 mole of hydrogen peroxide per mole of nitrile) were then added to the suspension, and the pH was maintained at 10.0 by adding 3.6 parts of a 58% by weight aqueous ammonium hydroxide solution. After the reaction was continued for 1 hour at room temperature, residual hydrogen peroxide was destroyed with sodium bisulfite, the pH was adjusted to 6.5 and the product was removed by filtration. The sedimentation volume test of the product indicated that the product was completely dispersible.

(c) The same basic procedure was followed in the preparation of each formulation described in this part of the example, with the exception that various alkaline catalysts and varying temperatures were employed therein.

In this basic procedure, 100 parts of a cyanoethylated tapioca starch base containing 2.36% nitrogen (on a dry basis) were suspended in granule form in 130 parts of water containing 30 parts of sodium sulfate as a gelatinization inhibitor, and varying amounts of an alkaline catalyst as set forth in the table that follows hereinafter were added to maintain a constant pH. To the reaction mixture 19.1 parts of a 30% aqueous solution of hydrogen peroxide (corresponding to 1.00 mole of hydrogen peroxide per mole of nitrile group) were then added. After reaction for 1 hour, the residual hydrogen peroxide was destroyed with sodium bisulfite, the pH was adjusted to 6.5, and the conversion product was recovered by filtration and washing. The percent of nitrogen in the products as well as the sedimentation volumes thereof, is set forth in the following table.

| Formulation No. | Catalyst | Parts of Catalyst | pH Maximum Temp. of Reaction | Percent Nitrogen in Product | Sed. Vol. at pH=3[1], ml. | Sed. Vol at pH=7.[1] |
|---|---|---|---|---|---|---|
| 1 | Triethylamine | 13.2 | 10.0, 41.0° C | 2.07 | 35 | 60 ml. |
| 2 | Trimethylphenyl ammonium hydroxide. | 17.7 | 9.8, 33.0° C | 2.19 | 18 | 19 ml. |
| 3 | Barium hydroxide | 8.0 | 10.9, 40.5° C | 1.76 | 72 | Completely dispersible. |

[1] Sedimentation volume of base: pH=3=9 ml., pH=7=10 ml.

*Example VI*

This example illustrates the use of a cyanoalkylated derivative in the process of my invention, said derivative being prepared by the reaction of corn starch with beta-chloropropionitrile.

Cyanoalkylated corn starch was made by running a Williamson reaction involving the reaction of a mixture comprising 100 parts of corn starch, 130 parts of water, 30 parts of sodium chloride, 10 parts of beta-chloropropionitrile, and 9.0 parts of calcium hydroxide for 16 hours at room temperature. The cyanoalkylated starch, containing 1.2% nitrogen (on a dry basis), was suspended in water. 11.0 parts of a 30% aqueous solution of hydrogen peroxide (corresponding to 1.13 moles of hydrogen peroxide per mole of nitrile) were then added to the suspension, and the pH was maintained at 10.0 by adding 5.0 parts of a 30% by weight aqueous sodium hydroxide solution as required. The mixture was agitated for 1 hour at room temperature, residual hydrogen peroxide was destroyed with sodium bisulfite, the pH was adjusted to 6.5, and the product was removed by filtration. The resulting product had a nitrogen content of 1.2% (on a dry basis) and infrared spectra indicated amide group formation.

Any departure from the above description which conforms to the present invention is intended to be included within the scope of the invention as defined by the following claim.

I claim:

A method for improving the dispersibility, in water, of intact granule cyanoethyl starch ethers, said method comprising the steps of suspending an intact granule cyanoethyl starch ether in an aqueous alkaline medium so that the intact granule cyanoethyl starch ether comprises the dispersed solid phase of a heterogeneous system wherein the water is the continuous phase; adding an aqueous hydrogen peroxide solution to the alkaline suspension of said intact granule cyanoethyl starch ether so that the hydrogen peroxide is present in a concentration of from about 1.0 to 2.2 moles per mole of nitrile groups in said intact granule cyanoethyl starch ether; reacting the resulting mixture at an alkaline pH level in the range of from about 9.0 to 12.0 and at a temperature which does not exceed 40° C. and for a period which does not exceed 20 hours; thereafter separating the resulting intact granule starch product from the aqueous reaction medium wherein it comprises the solid phase of a heterogeneous system wherein the water is the continuous phase; the latter intact granule starch product being a starch ether containing substituent groups selected from the class consisting of amidoethyl groups and combinations of amidoethyl and cyanoethyl groups.

References Cited by the Examiner

UNITED STATES PATENTS

| | | | |
|---|---|---|---|
| 2,938,026 | 5/1960 | Stephens et al. | 260—233.3 |
| 3,033,852 | 5/1962 | Paschall | 260—233.3 |
| 3,070,594 | 12/1962 | Harris et al. | 260—233.3 |

OTHER REFERENCES

MacGregor, J. H.: Journal of the Society of Dyers and Colourists, vol. 67 (1951), "The Reaction of Acrylonitrile with Macromolecular Hydroxy Substances," pp. 66–73.

Wagner, R. B. et al.: Synthetic Organic Chemistry, J. Wiley & Sons, N.Y. (1953), p. 570.

LEON J. BERCOVITZ, *Primary Examiner.*

LOUISE P. QUAST, *Examiner.*

E. C. EDWARDS, R. W. MULCAHY,
*Assistant Examiners.*